March 19, 1963 G. STABENOW 3,081,749
HOT WATER GENERATOR
Filed Sept. 18, 1959 7 Sheets-Sheet 3

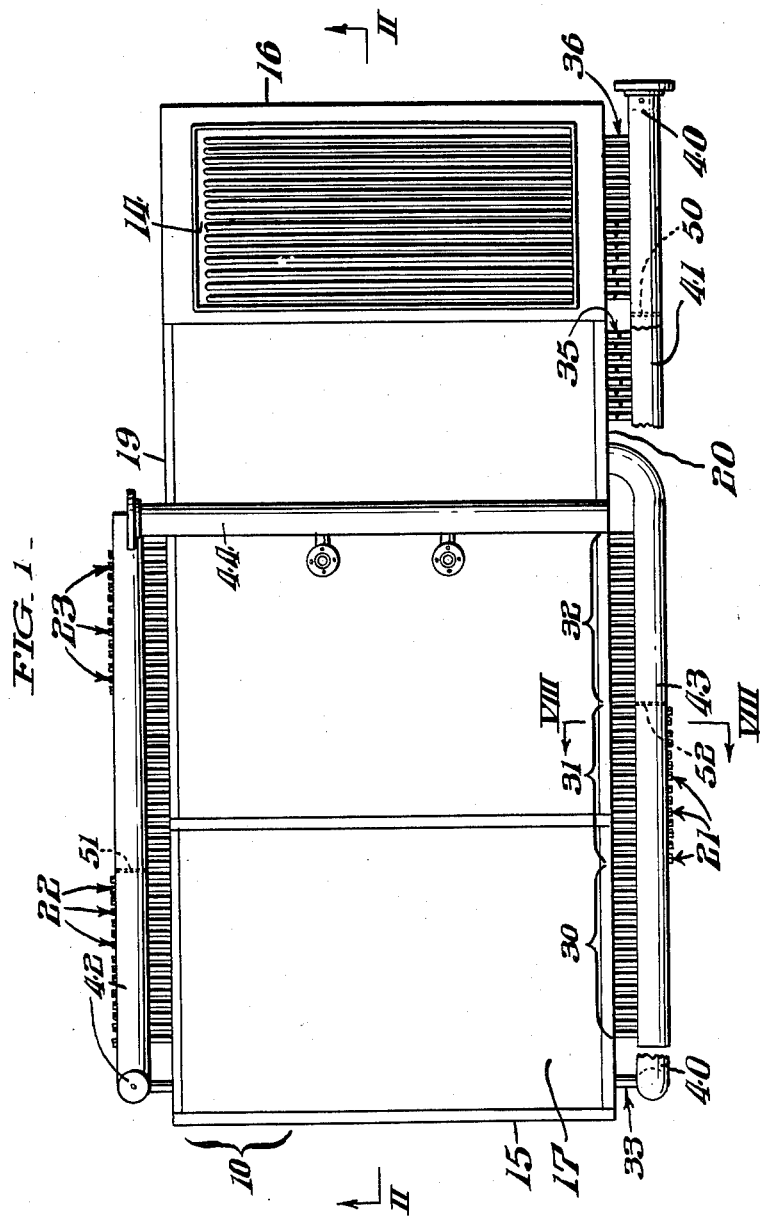

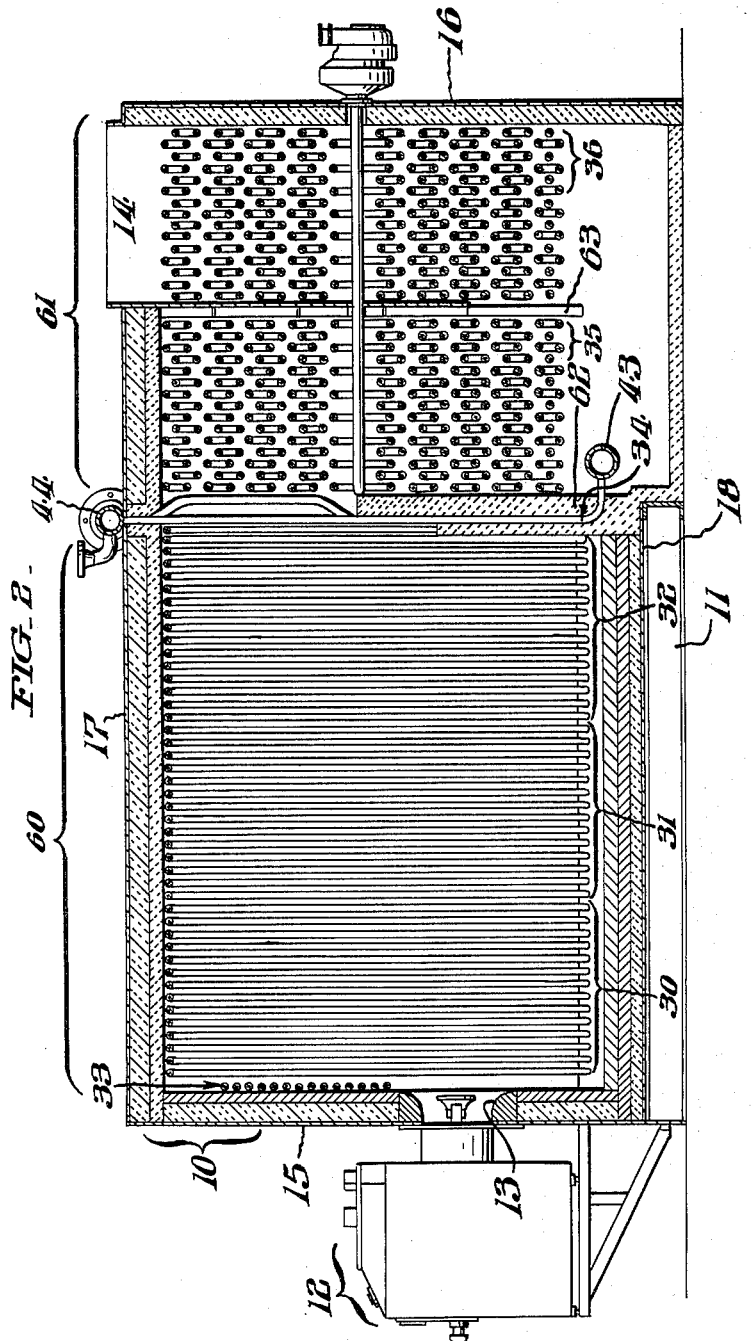

INVENTOR.
Georg Stabenow,
BY Paul & Paul
ATTORNEYS

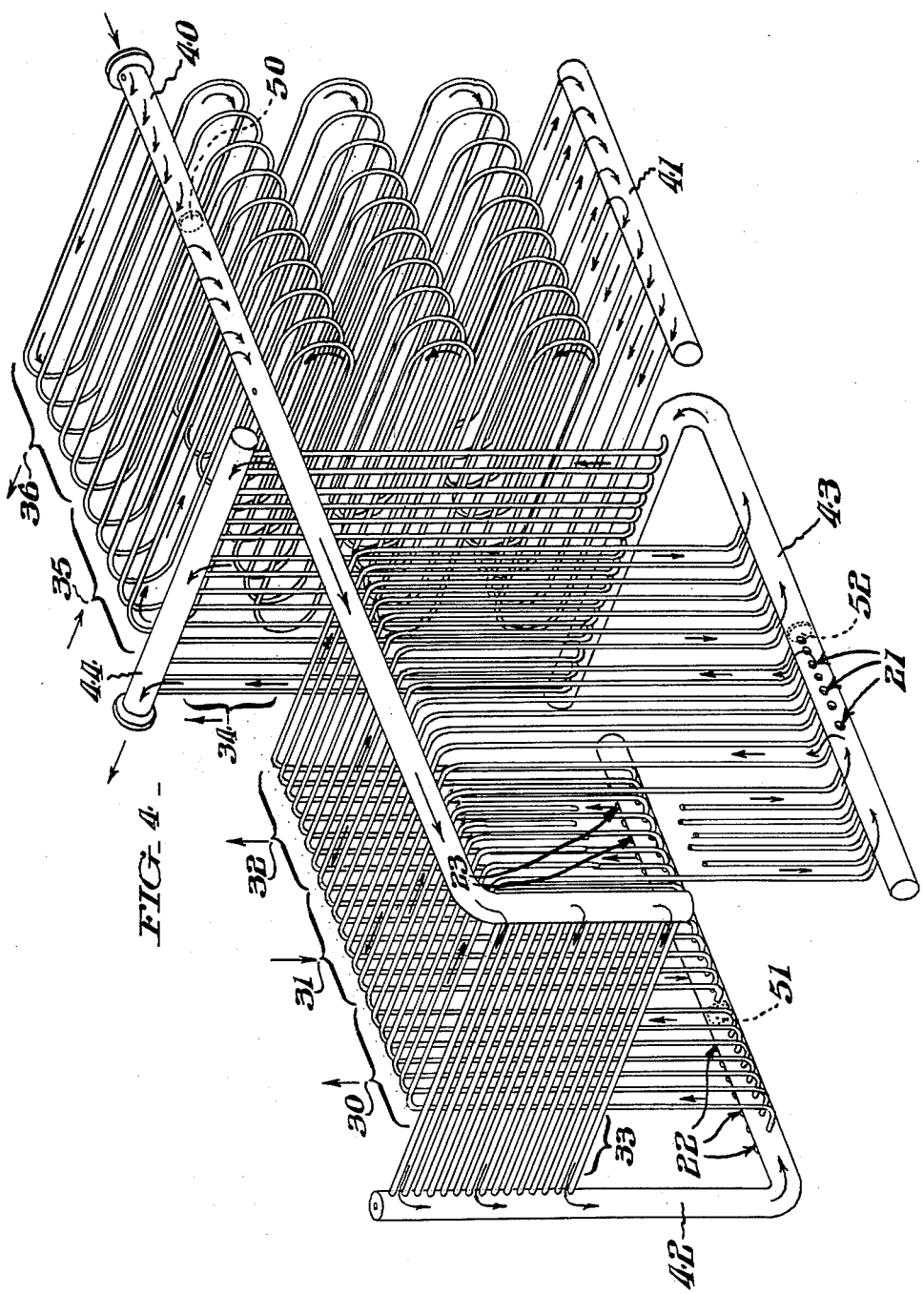

March 19, 1963 G. STABENOW 3,081,749
HOT WATER GENERATOR
Filed Sept. 18, 1959 7 Sheets-Sheet 5
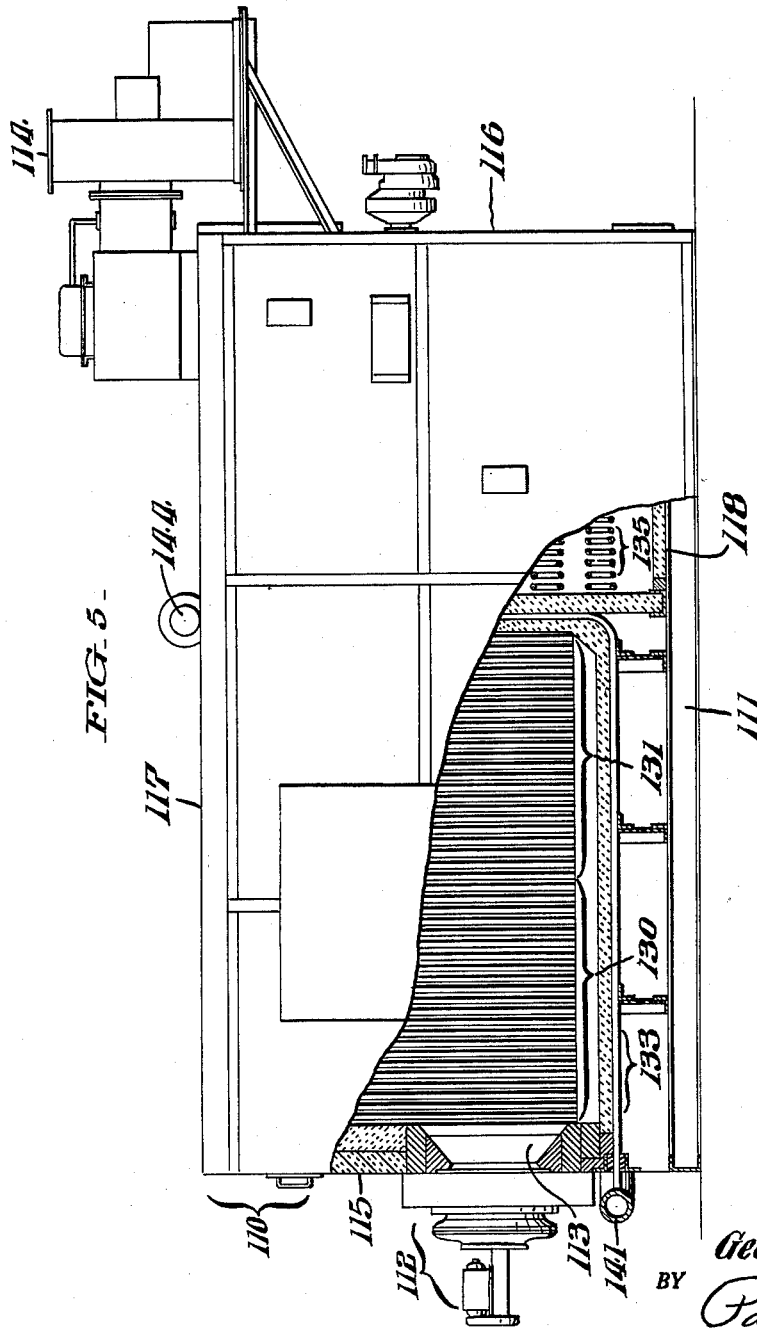
INVENTOR.
Georg Stabenow,
BY Paul & Paul
ATTORNEYS

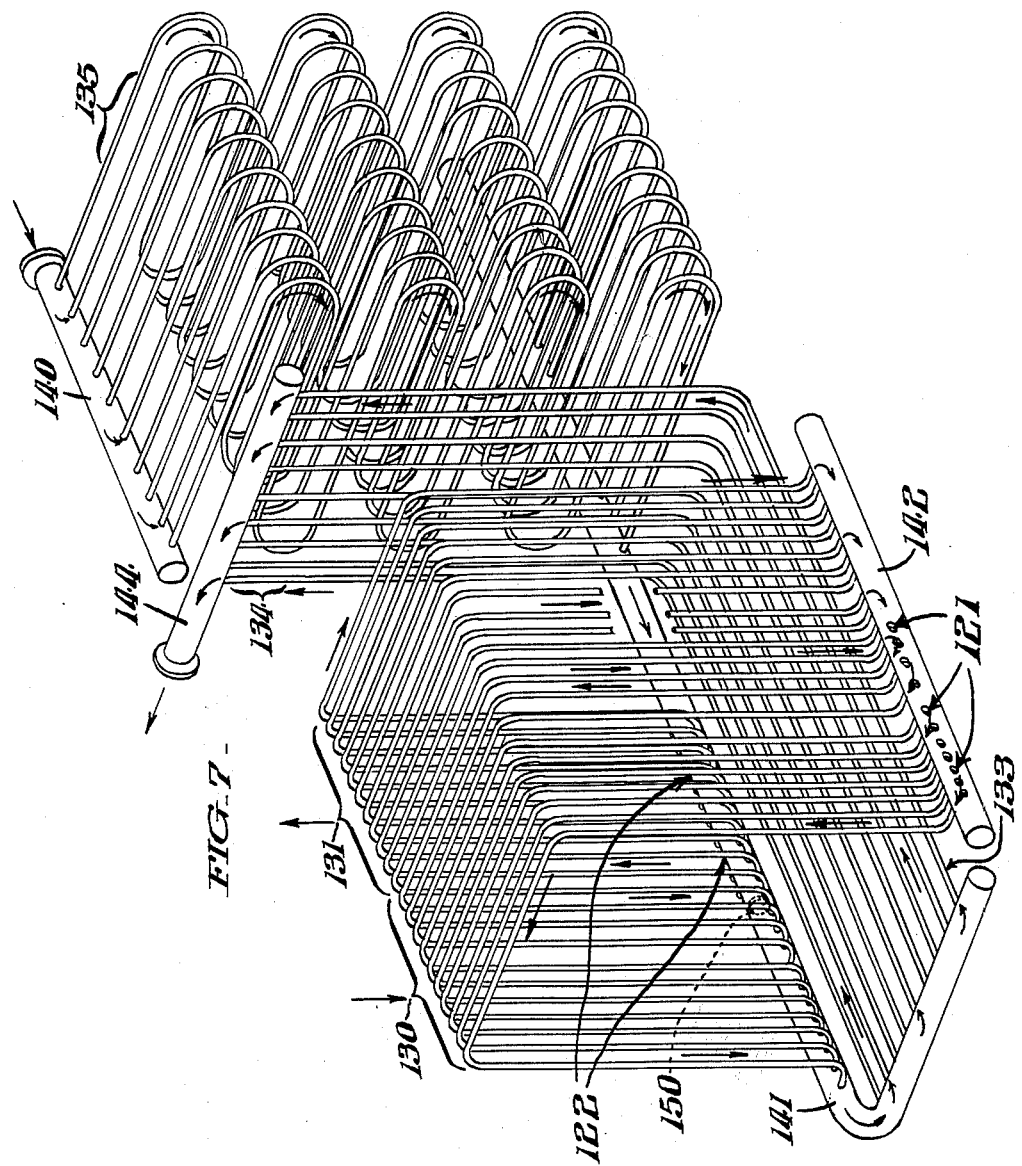

United States Patent Office 3,081,749
Patented Mar. 19, 1963

3,081,749
HOT WATER GENERATOR
Georg Stabenow, East Stroudsburg, Pa., assignor to La Mont Steam Generators, Inc., New York, N.Y., a corporation of Delaware
Filed Sept. 18, 1959, Ser. No. 840,846
10 Claims. (Cl. 122—406)

This invention relates to hot water generators and in particular to hot water generators of the type in which water is circuated through tubes provided for that purpose which are subjected to flame discharged from a burner.

It is a principal object of this invention to provide a hot water generator of the above type which reduces to a minimum the number of external headers required thus providing a lighter, more compact, structure and which reduces the pressure drop of the circulating fluid thereby maintaining the fluid pressure.

In describing the preferred embodiment of the invention illustrated in the drawings, specific terminology will be resorted to for the sake of clarity. However, it is not the intention to be limited to the specific terms so selected.

Other objects and advantages will be apparent from the following description and drawings.

FIG. 1 is a plan view of a hot water generator made according to the invention;

FIG. 2 is a side elevation of the structure of FIG. 1 partly in cross-section along the line II—II of FIG. 1;

FIG. 3 is an end view of the structure of FIG. 1 partly broken away and partly in section;

FIG. 4 is a perspective view of the internal tubes of the structure of FIG. 1 illustrating the direction of fluid flow;

FIG. 5 is a side elevation partly broken away and partly in section of a further embodiment of the invention;

FIG. 7 is a perspective view of the internal tubes of the structure of FIG. 5 illustrating the direction of fluid flow;

FIG. 8 is a cross-sectional view illustrating the orifice structure used in the invention taken along the line VIII—VIII in FIG. 1.

Figure 6:
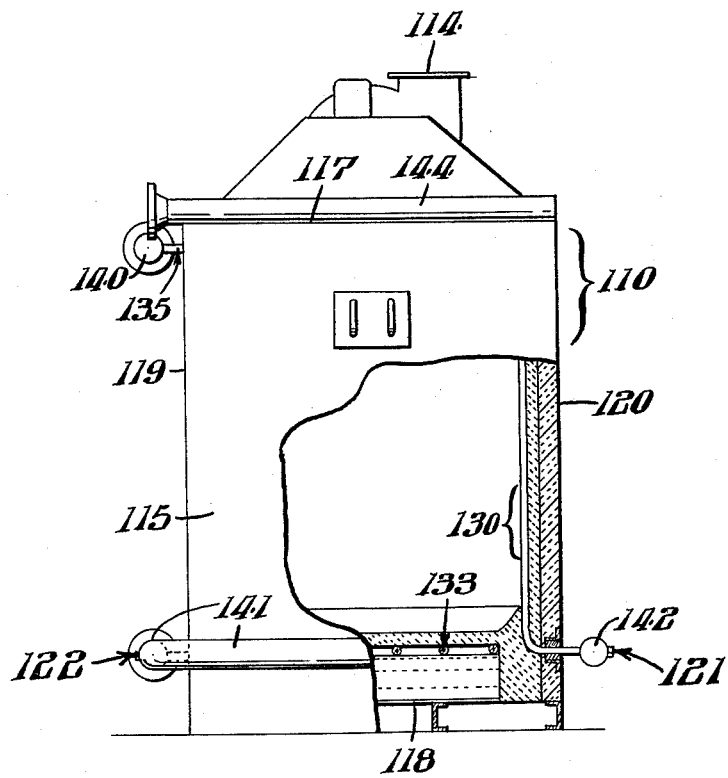
FIG. 6 is a side elevation of the structure of FIG. 5 partly in cross-section and partly broken away.

The hot water generator of this invention comprises a housing 10 based upon a floor 11 of concrete or other suitable foundation material. Fuel is burned in burner 12 and the combustion products pass through opening 13 into the interior of housing 10. The combustion products pass through housing 10 and are dissipated through flue 14. Housing 10 is made up of front wall 15, back wall 16, roof 17, base 18 and side walls 19 and 20.

Within the housing 10 are arranged a series of fluid carrying tubes arranged in banks 30, 31 and 32 which are disposed to bridge across the floor 18. A bank of front water wall tubes 33 span front wall 15 of housing 10. To the rear of bridge tubes 30, 31 and 32 is a vertical bank 34 and to the rear of this a series of horizontally disposed banks 35 and 36. Horizontal banks 35 and 36 are connected to inlet header 40 and are connected at their remote ends to return tube 41. Front bank 33 is connected at one end to inlet header 40 and at the other to connecting tube 42. Bridge banks 30, 31 and 32 are conneced at one side to tube 42 and at the other to tube 43. Tube 43 is in turn connected to vertical bank 34 which connects to exhaust header 44.

In operation, fuel is burned in burner 12 and the combustion products pass through housing 10 to flue 14. The fluid to be heated enters the generator as illustrated in FIG. 4 through inlet manifold 40. The fluid passes into bank 36 which is a series of tubes arranged in parallel from header 40. Thence the fluid passes downward through the bank 36 to return tube 41. The fluid then enters bank 35 which is also a section of tubes arranged in parallel and passes upwardly to again enter header 40. The fluid thus heated proceeds to the front wall of housing 10 through header 40 where it enters front bank 33 which is a series of tubes arranged in parallel from header 40. From bank 33 the fluid passes through tube 42 to bridge bank 30 which carries across housing 10 to tube 43. The fluid is returned to tube 42 through bridge bank 31 and is again returned to tube 43 through bridge bank 32. From bank 32 the fluid is carried to vertical bank 34 through tube 43. It is then passed vertically across the header of housing 10 to outlet header 44.

The passage of fluid from header 40 into bank 36 is controlled by plug 50 disposed in header 40 to prevent flow in header 40 past that point. Likewise in tube 42 plug 51 compels the fluid to flow into bank 30 and in tube 43 plug 52 prevents the fluid from passing further in that tube.

Within the forward heating section 60 of housing 10, the fluid-carrying tubes are disposed about the walls of the housing generally without obstruction to the passage of the combustion products of burner 12. However, rear section 61 is separated from forward section 60 by vertical wall 62 which deflects the combustion products upward as they enter rear section 61. Within rear section 61, vertical baffle 63 is dependent from roof 17 and serves to deflect the combustion products downward past bank 35. They then pass upward through bank 36 to exhaust flue 14.

The arrangement of tubes in the hot water generator of this invention thus is partially counterflow to the passage of heating gases and partially concurrent with the passage of the heating gases. Upon first entering the generator in rear section 61, the fluid runs in the opposite direction to the heating gases which are normally at a lower temperature than in forward section 60 of housing 10. Rear section 61 thus serves as a counterflow pre-heater in which the heating gases are brought into intimate contact with the fluid carrying tubes. From rear section 61 the fluid is passed directly to the front wall of the housing 10 where the direction of fluid flow is neutral with respect to the passage of heating gases. From this point, through the principal heating sections 30, 31 and 32, the fluid runs continuously in the same direction as the heating gases until it reaches vertical bank 34 which is the final heating section in the generator.

The generator thus provided has been found to be efficient in terms of fuel consumption and maintenance of fluid pressure from inlet to outlet. It can be built compactly and simply. It is to be understood that the invention is not limited to the precise number of tubes or banks of tubes shown but that more or less tubes may be employed in any of the banks and more banks may be employed within any section within the scope of the invention.

A further embodiment of the invention is illustrated in FIGS. 5, 6 and 7. The structure shown there comprises a housing 110 having a front wall 115, rear wall 116, roof 117, floor 118 and side walls 119 and 120. The housing is based upon a suitable foundation 111. Fuel is burned in burner 112 and enters housing 110 through opening 113 in front wall 115. The products of combustion pass through housing 110 from opening 113 to flue 114.

Within housing 110 are arranged a plurality of sections of fluid-carrying tubes, banks 130 and 131. A bank of floor tubes 133 extends across the floor of housing 110 and extends vertically to form a vertical bank 134. A bank of horizontally disposed tubes 135 is located at the rear of vertical bank 134. Inlet header 140 is connected to bank 135 which is in turn connected to tube 141. Tube 141 is connected to one side of bridge wall banks 130 and 131 which are connected in the opposite side to return tube 142. An extension of tube 141, perpendicular to the main section thereof, is connected to the floor bank 133. The vertical extension 134 is connected to outlet header 144. Tube 141 is provided with a plug 150 which separates banks 130 and 131.

In operation, fuel is burned in burner 112 and the products of combustion pass through housing 110 to flue 114. The fluid to be heated enters the generator, as illustrated in FIG. 7, through inlet header 140. It then passes through bank 135, which is a series of tubes arranged in parallel. From bank 135 the fluid enters tube 141 and is carried to bridge bank 131 in which it crosses housing 110 to return tube 142. It then recrosses housing 110 in bank 130 and reenters tube 141. The fluid is then carried to the bank of floor tubes 133 and proceeds along the floor 111 and up the vertical bank 134 to outlet header 144.

The principal differences between embodiment of the invention illustrated in FIG. 4 and that illustrated in FIG. 7 are that in the latter embodiment, there is a floor water wall while in the former there is a front bank of tubes disposed across the front wall of the housing. However, as in the case of the embodiment of FIG. 4 that of FIG. 7 provides for the entry of fluid into the generator in a direction contrary to the flow of heating gases to the rear of the generator followed by the delivery of the fluid to the forward heating section. In the embodiment of FIG. 7 the fluid is bridged across the housing proceeding generally in a forward direction. From the front it passes back through the floor bank 133 to vertical bank 134. In each case the initial heating of the fluid takes place in the connection tubes in the rear of the housing followed by passage to the bridge wall at the forward part of the housing, finally passing to the outlet header through a vertical bank transversely disposed across the flow path of the heating gases.

In the boiler structures described above and illustrated in the drawings, orifices are used in the forward or combustion chamber 60. The orifices are inserted in the boiler tubes at the headers to provide balanced flow through the tubes. In FIG. 1 orifices 21 are inserted in header 43 connected to boiler tubes 31. Orifices 22 are inserted in header 42 and connected to boiler tubes 30 and orifices 23 are inserted in header 42 and connected to boiler tubes 32. In the embodiment shown in FIG. 7 orifieces 121 are inserted in header 142 and connected to boiler tubes 130. Orifices 122 are inserted in header 141 and connected to boiler tubes 131. The orifice structure is shown in FIG. 8 with particular reference to an orifice inserted in header 43. The boiler tube 31 is inserted in the header and is provided with a flattened end to secure it there. A strainer tube 24 is inserted in the inner end of tube 31 and strainer 24 and tube 31 are provided with complementary flared and tapered portions to provide suitable alignment and engagement. The end of strainer tube 24 remote from boiler tube 31 is maintained in place by retainer plug 29 which extends from header plug 28 which is threadably inserted in header 43. Orifice plate 25 having an opening 26 is inserted in the end of strainer tube 24. The heated fluid passes through the opening 26.

The size of the opening 26 is related in a predetermined manner to the rate of flow of fluid through the boiler tubes and the potential drop or fluid head between headers such as header 42 and header 43 in the case of boiler tubes 31 so that the pressure drop of the fluid flowing through the opening 26 is greater than the head of fluid between the two headers. The particular purpose is to prevent vaporization which could block the flow of fluid through the boiler tubes. If, for example, vaporization should occur in a single tube of the series of boiler tubes 31, the pressure effect of the hydraulic head of the tube would be at least partially lost but with the orifice present its pressure drop would still be more than equivalent to the fluid heads of the other tubes of the series. Thus, there is positive assurance that there will always be a greater pressure at the intake portion of the tube than the back pressure due to the heights of the fluid columns of the other tubes of the series even when vaporization has started to take place in a single tube. The prevention of vaporization is particularly important in the downflow portions of the boiler tubes in the combustion portion of the generator. In the present case, there is downflow in each of the boiler tubes in the forward or combustion portion 60 of the generator. Orifices are therefore provided in each tube in each section of boiler tubes 30, 31 and 32. This assures that there will always be downflow of liquid in all tubes which, in turn, assures that an incipient vaporization will be halted before it can develop into the creation of a hot spot.

Accordingly, it will be appreciated that notwithstanding the fact that the recirculated liquid has already been heated in the convection portion 61, it does not vaporize in the combustion section 60 in a manner to impede the downflow of liquid. The downwardly flowing hot liquid in the combustion section 60 is apportioned by the orifices and headers 42 and 43 in the embodiment of FIG. 1 and headers 141 and 142 in the embodiment of FIG. 7. This apportionment is achieved by neutralizing any localized tendency toward reverse flow in any individual tube which is exposed to the intense heat of the burner flame as has been described above. The words "apportioning" and "apportionment" are not intended to imply a distribution in exactly equal proportions since the relative quantities of flow may vary somewhat from tube to tube and from time to time. However, when the downwardly directed flow in any given tube tends to stop or slow down greatly with respect to the flow in the other tubes, the operation of the orifices tends to increase the rate of flow into that tube with respect to the rate of flow into the other tubes of the series and the foregoing words are intended to apply to such relative increase. Even intense heat directed on a relatively small area of the boiler tubes is insufficient to impede the downflow of liquid enough to damage the tube.

In the generator of the present invention there is downflow in every boiler tube in the combustion section. This is an inherent part of the highly efficient and advantageous structure of the generator. In order to enable this structure to function without impedance due to vaporization, the orifices are employed as described. It will be noted that orifices are not required in the vertical bank 34 which exhausts to outlet header 44 since the flow in these tubes is upward and directly connected to the outlet of the generator.

While in accordance with the provisions of the statutes, I have illustrated and described the best form of embodiment of my invention now known to me it will be apparent to those skilled in the art that changes may be made in the form of the apparatus described without departing from the spirit and scope of the invention, as set forth in the appended claims, and that in some cases certain features of my invention may be used to advantage without a corresponding use of other features.

Having thus described my invention, I claim:

1. A hot water generator comprising a housing having a roof, a floor, front and back walls and side walls, heating means disposed in one wall of said housing, flue means for emitting the products of said heating means disposed in the roof of said housing at a place remote from said heating means, first fluid-carrying tube means transversely disposed in said housing remote from said heating means and arranged for carrying fluid progressively nearer thereto, second fluid-carrying tube means disposed about the inside of said housing bridging the floor thereof, said second tube means being placed in said housing between said heating means and said first tube means and arranged to carry fluid transversely back and forth across said housing and up and down the side walls thereof, third fluid-carrying tube means vertically disposed across the width of said housing between said first tube means and said second tube means, header means disposed exterior of said housing for introducing fluid to said first tube means, first fluid-conveying connecting means disposed exterior of said housing for carrying said fluid from said first tube means to said second tube means, second fluid-conveying connecting means for carrying said fluid from said second tube means to said third tube means and outlet header means disposed exterior of said housing and connected to said third fluid-carrying tube means for delivering said fluid from the generator.

2. The hot water generator of claim 1 wherein a bank of tube means arranged in parallel is interposed in the fluid carrying circuit of said generator between said first tube means and said second tube means, said bank being located along the front inner wall of said housing above said heating means.

3. The hot water generator of claim 1 wherein the third tube means extends along the floor of said housing substantially to the front wall thereof.

4. The hot water generator of claim 1 wherein the first tube means comprises a plurality of banks of fluid-carrying tubes, said tubes being arranged in parallel and said banks being arranged in series and wherein a plurality of baffles are connected to said housing and arranged to separate said banks of tubes, said baffles being disposed to direct the products of said heating means into intimate contact with said tube means prior to being emitted through said flue means.

5. The hot water generator of claim 1 wherein a baffle separates said first tube means and said second tube means and extends vertically upward from the floor of said housing.

6. The hot water generator of claim 1 wherein the first tube means comprises a plurality of banks of fluid carrying tubes, said tubes being arranged in parallel within each bank and said banks being arranged in series, said header means connected to one end of one of said banks, fluid-carrying tube means disposed at the other end of said bank and connected to one end of the next adjacent bank for conveying the fluid from one bank to the next.

7. The hot water generator of claim 1 wherein the header means and the first fluid-conveying connecting means comprise a single tube having plug means disposed therein for separating adjacent banks of tubes in said first tube means.

8. The hot water generator of claim 1 wherein the second tube means comprises a plurality of banks of fluid-carrying tubes, the tubes being arranged in parallel within each bank and the banks being arranged in series, said banks being arranged to cause the fluid to flow from the front toward the rear of said housing.

9. The hot water generator of claim 1 wherein the second tube means comprises a plurality of banks of fluid-carrying tubes, the tubes being arranged in parallel within each bank and the banks being arranged in series, said banks being arranged to cause the fluid to flow from the rear to the front of said housing.

10. The hot water generator of claim 1 wherein the first fluid-conveying connecting means comprises a single tube having plug means disposed therein for separating adjacent banks of said second tube means.

References Cited in the file of this patent

UNITED STATES PATENTS

| | | |
|---|---|---|
| 1,932,918 | Abendroth | Oct. 31, 1933 |
| 2,142,612 | Lucke | Jan. 3, 1939 |
| 2,860,612 | Durham | Nov. 15, 1958 |